3,089,815
INJECTABLE PHARMACEUTICAL PREPARATION, AND A METHOD OF MAKING SAME
Hans Lieb, Universitaetsplatz 2, Graz, Austria; Ernst Kupelwieser, Moenchsberg 17, Salzburg, Austria; and Anton Holasek, Universitaetsplatz 2, Graz, Austria
No Drawing. Original application Oct. 11, 1951, Ser. No. 250,961, now Patent No. 2,961,374, dated Nov. 22, 1960. Divided and this application Oct. 26, 1960, Ser. No. 65,097
Claims priority, application Austria Oct. 14, 1950
15 Claims. (Cl. 167—58)

The present invention relates to injectable pharmaceutical preparations capable of forming, on injection, depots of therapeutically effective compounds, and a method of making same.

The present application is a division of copending application Serial No. 250,961, filed October 11, 1951, and entitled "Injectable Pharmaceutical Preparation, and a Method of Making Same," now Patent No. 2,961,374.

In therapy, it is often of great importance that therapeutically effective compounds, when administered parenterally, have a prolonged activity. In order to achieve this purpose, a depot of the therapeutically effective compound is produced in the body by injection at the place of injection, said depot allowing continuous but retarded absorption and, thus, continuous but prolonged action of the therapeutically effective compound.

However, it was found to be very difficult to maintain a sufficiently high blood level of such compounds over a prolonged period of time without causing overdosing. In order to produce such depots, various methods were suggested heretofore. For instance, difficultly soluble drugs were implanted in the form of pellets or the like into the body. Readily soluble drugs were coated, before implantation, with coatings which rendered their absorption by the body fluids more difficult. Such coatings consisted of waxes and the like. This manner of producing a depot of a therapeutically effective compound in the body has several disadvantages. First, implantation necessitates a bloody operation with all the dangers of infection and the like connected therewith. Frequently, the implanted pellets, soon after implantation, were surrounded by tissue and are, so to say, encased in the form of a cyst, thus preventing further absorption of the therapeutically effective compound.

Another method of producing depots of therapeutically effective compounds consists in injecting such a compound in the form of a suspension in suitable liquids. However, when using water soluble compounds, and injecting, for instance, their suspensions in oils and the like, the retarding effect of such injections is usually very short and it is often difficult to avoid overdosing and the reaction of an excessively high blood level shortly after injection and of too low a blood level later on.

It has also been suggested to administer the therapeutically effective compound in the form of an emulsion or dispersed in a viscous colloidal vehicle, said emulsions and vehicles being adapted to retard absorption. Procaine penicillin, for instance, has been administered in suspension in an oily vehicle to which aluminum stearate was added. Thereby a thixotropic medium is formed which prevents too rapid absorption of the penicillin salt. But such thixotropic additions cause only a slight and temporary increase in viscosity and do not form a depot of sufficiently prolonged activity. Such suspensions have furthermore the disadvantage that they tend to clog the injection needle. Therefore, injection needles of large diameter have to be used which cause pain on inserting them into the body.

Mixtures of polyvinyl alcohols or their water-soluble derivatives with at least one solvent capable of dissolving said polyvinyl compounds and with the addition of Congo red, have also been suggested as carriers for the therapeutically effective compounds. Such mixtures are liquid at about 45° C. Such preparations were injected at 45° C. and solidified at body temperature. The injection of such a warm preparation is quite disagreeable. Furthermore, since such solidified polyvinyl compounds are water-soluble, even in the solid state, they are very readily dissolved by the body fluids and absorbed. Therefore, the prolonged effect achieved by using such a carrier for a therapeutically effective compound is comparatively short.

The method of implanting pellets and the like by surgical operation should be avoided if possible, especially if the therapeutically effective compound has to be administered repeatedly. Furthermore, said compounds, on account of their decreased solubility when compressed to tablets, pellets, and the like, very often are not sufficiently soluble to produce the desired therapeutic effect.

Emulsions and colloidal vehicles have the disadvantage that only emulsions and vehicles having a limited range of viscosity can be used for the production of depots because difficulties in injecting such emulsions and vehicles are often encountered. Even when using syringes with needles with a very wide diameter, only such vehicles are suitable for injection which are still liquid and flowable.

With thixotropic vehicles, only slight and labile changes and increases in viscosity are produced, due to the nature of the thixotropic phenomenon. The vehicles do not solidify as is necessary to produce depots of long duration.

One object of the present invention is to provide depot vehicles for therapeutically effective compounds which depot vehicles allow injection by means of ordinary syringes and needles of normal diameter and, thereby, production of depots which are dissolved mainly by fermentative or cellular effects.

Another object of this invention consists in providing pharmaceutical preparations for parenteral administration which, on injection, produce a prolonged effect of the therapeutically active compound contained in said preparation but which does not possess the disadvantages of the known and heretofore used depot preparations as mentioned above.

Other objects of this invention will become apparent from the specification and the examples illustrating the invention more in detail.

The invention consists in principle in combining at least two water soluble components which may be liquid or solid compounds or may be employed in solution and which are capable of reacting with each other, or influencing each other, in such a manner that the solubility of the reaction product in water is reduced and the reaction product solidifies. Such proportions of said components are used that the injectable solution obtained by such a combination, initially, is liquid below or at body temperature but solidifies to a difficulty soluble depot within a predetermined period of time. The two or more components are combined with each other, preferably immediately before injection, in such a manner that they solidify in the body after a predetermined period of time, as planned. Said components must be substantially non-toxic and non-irritating to and well tolerated by the body, in the concentrations and amounts employed. Their reaction product forming the depot vehicle must be slowly but completely absorbed from and eliminated by the body.

In order to carry out the process of this invention, there is first prepared a solution of a coagulable, setting, or in any other manner solidifying material as well as a solution of a material capable of inducing or causing such coagulation, setting, or solidification, for instance, a solution of a coagulating or hardening agent. The concentration of said solutions are adjusted with respect to each other in such a manner that, after combining the same, the materials contained therein solidify after a predetermined period of time and form a difficultly soluble depot within the area of administration to the body. Examples of such systems are, for instance: Fibrinogen-thrombin, gelatin-formaldehyde, gelatin-quinone, gelatin-cobalt compounds, gelatin-chromium compounds, and many others. Of course, it is possible to use at the same time more than one hardening agent and/or more than one solidifying material. The therapeutically effective compound may be dissolved or dispersed in any one or in all of these components. It may also be added to the solution obtained after combining the two components, just before injection.

The injection solution may be rendered less viscous by various methods, such as a slight heating, addition of compounds capable of regulating viscosity, and the like. Of course, only such additives should be used which do not substantially impair subsequent solidification of the components.

The process according to the present invention and the preparations obtained thereby may be used, among others, for producing depots of analgesics, local anesthetics, antibiotics, agents stimulating the vegetative nervous system, hormones, especially insulin, parathyroid hormone, pituitary gland hormones, agents to produce controlled hypothermia agent useful in the treatment of parkinsonism antiepileptic agents, antihistaminic agents, prolylactic and therapeutic agents administered in the prevention and treatment of apoplexia, and others.

According to this invention, a vehicle for a therapeutically effective compound is used which, before injection, is in the liquid state but which, after injection, solidifies at the place and area of injection to a difficultly soluble, solid, for instance gel-like material, said material retaining dispersed therethrough the therapeutically effective compound so that its absorption is retarded and that it exerts a prolonged effect. Dissolution and absorption of the therapeutically effective compound from said solidified vehicle takes place either by diffusion or by dissolution at a rate at which the vehicle itself is dissolved and absorbed by the body.

One of the components may be used in solid form and the other in the form of a solution. The components may also be mixed in solid dry form and may be dissolved shortly before injection so as to yield the solidifying or, respectively, gelling mixture. The components may be solidified in the body by coagulation but also other types of solidification may be used. Especially suitable is a system of compounds which solidifies by hardening and sets to a mass which is relatively insoluble in body fluids.

A coagulating system suitable for carrying out this invention is the system fibrinogen-thrombin. Fibrinogen, thrombin, and a preferably difficultly soluble therapeutically effective compound, in the dry state, are placed into a vial. The amount of thrombin is calculated in such a manner, that a solution of the contents of said vial, preferably a physiological salt solution, requires, at a temperature of 37° C., about 4 minutes to 5 minutes for coagulating the fibrinogen solution. For administering said fibrinogen-thrombin drug mixture, the contents of said vial are mixed with the necessary amount of physiological salt solution whereby a suspension of the medicament in the fibrinogen-thrombin solution is obtained. On account of the comparatively low temperature of the salt solution the coagulation time is somewhat retarded. But on injecting such a mixture and suspension into the body, the fibrinogen very soon forms a fibrin gel which keeps the drug in an adsorbed condition and prevents its rapid absorption by the body fluids. However, after a certain period of time the fibrin also is gradually and completely absorbed by the body thereby gradually releasing the drug which is slowly absorbed at the same rate. The fibrin, as long as it is present in the body, prevents too rapid an absorption of the drug because it forms a comparatively firm combination therewith. Only after the fibrin molecule has been broken down will the drug be absorbed because it is then exposed to the action of the body fluid. It is possible, for instance, to produce by this method prolonged nerve block anesthesia by means of dibucaine hydrochloride (2-butoxy-N-(2-diethylamino ethyl) cinchonine amide hydrochloride). This compound, as is known, is many times more effective than procaine hydrochloride but also more toxic. By the method of this invention, larger amounts of said dibucaine hydrochloride may be administered thus causing a more prolonged anesthetic effect without the danger of disagreeable side-effects, such as necrosis of tissue, gangrene or, in lower concentrations, of slight temporary vascular dilatation.

Another very suitable system which is preferably employed to carry out this invention is the system gelatin-formaldehyde. It is advisable to employ for the purpose of this invention a gelatin of a melting point as high as possible. The suitability of a gelatin may be determined in a simple and effective manner by preparing an 18% aqueous solution of gelatin, adding 0.2 cc. of a 2.5% formaldehyde solution to 2.0 cc. of said 18% gelatin solution, mixing the mixture thoroughly by means of a glass rod, and determining the gelling time at 37° C. The better the gelatin, the quicker does the solution gel. Such 18–20% gelatin solutions are, even at 37° C., rather viscous. Their viscosity and melting point is lowered considerably by the addition of potassium thiocyanate, for instance, in amounts of 3–5%. A further reduction of viscosity is achieved by the addition of calcium ions which are supplied, for instance, in the form of an 0.7% calcium chloride solution.

Since formaldehyde has a slightly irritating effect, care must be taken to use as little thereof as possible. This is achieved by the use of gelatin solutions of high concentration. Addition of a small amount of an alkali metal hydroxide has proved of value. For instance, the addition of 1 cc. of a N/10 sodium hydroxide solution to 2 g. of gelatin causes buffering of the gelatin solution and the irritating effect of formaldehyde is diminished while the pH-value of the injection-solution does not exceed a pH of about 8.0. When preparing, for instance, an insulin composition of prolonged activity, such a small addition of sodium hydroxide does not impair its activity. Apparently the insulin is protected by the gelatin. The higher the alkali metal hydroxide concentration, the lower the amount of formaldehyde required for hardening the gelatin.

Although formaldehyde addition shortly before injection apparently protects the gelatin solution against contamination by infective microorganisms, it is nevertheless advisable to subject the gelatin solution to sterile filtration, for instance, by means of a Seitz filter and the like. A highly concentrated gelatin solution (18–20%), however, can not be filtered through such a filter. Therefore, a dilute solution of, for instance, 10–12% gelatin is filtered and is subsequently concentrated by evaporation in a vacuum.

The formaldehyde solution used contains preferably about 1% of formaldehyde. 0.2–0.3 cc. are added to 2 cc. of an 18–20% gelatin solution. The formaldehyde solution is preferably stabilized. This can be done, for instance, by the addition of sodium chloride. Amounts of 5% to 10% of sodium chloride have given satisfactory stabilizing effects.

When adding formaldehyde to a slightly alkaline gelatin solution, a gel is formed immediately at the places of contact of the gelatin and the formaldehyde solution.

In order to avoid such premature gel formation, hydrochloric acid is added to said formaldehyde solution. Gel formation takes place only after said acid is neutralized, i.e. as soon as both solutions have been mixed thoroughly. The formaldehyde solution contains preferably about 0.365 g. of hydrochloric acid in 1000 cc., corresponding to an N/100 hydrochloric acid solution.

As has been found, best results are obtained by using a formaldehyde solution containing about 1% of formaldehyde, 0.0365% of hydrochloric acid, and 5% to 10% of sodium chloride. Such a formaldehyde solution is kept in tube-like graduated ampoules provided with rubber closure caps which allow easy withdrawal of amounts of 0.2 cc.

Gelatin and formaldehyde concentration have a considerable influence upon gelling time as is evident from the following Table 1:

*Table 1*

| Formaldehyde per 0.2 cc. | Gelling time, in minutes, of a gelatin solution containing $x$ percent of gelatin | | | |
|---|---|---|---|---|
| | 16.7% | 18.0% | 19.3% | 20.6% |
| 6 mg. (3%) | 7.5 | 6.3 | 4.5 | 2.5 |
| 4 mg. (2%) | 18.0 | 11.0 | 9.0 | 6.0 |
| 2 mg. (1%) | several hours | | More than 60 | 25.0 |

When adding sodium hydroxide to the gelatin solution, the amount of formaldehyde necessary to produce a gel within a reasonable period of time is considerably reduced as is evident from the following Table 2:

*Table 2*

2 cc. of a 23% gelatin solution to which the below given amounts of sodium hydroxide were added, were hardened by the addition of 0.2 cc. of a 4% formaldehyde solution within the following period of time:

| Sodium hydroxide addition expressed in normality | 0.0045 | 0.0023 | 0.0011 | 0.0006 |
|---|---|---|---|---|
| Gelling time in minutes | 1.2 | 1.5 | 2.5 | 3.5 |

2 cc. of a 10.7% gelatin solution containing sodium hydroxide in an amount sufficient to form an 0.0045 N solution, yield with 0.2 cc. of a 1% formaldehyde solution a honeylike mass within 21 minutes.

2 cc. of a 20% gelatin solution of 0.01 normality in sodium hydroxide form with 0.5 cc. of an 0.3% formaldehyde solution a gel within 8 minutes.

2 cc. of a 20% gelatin solution of 0.01 normality in sodium hydroxide form with 0.5 cc. of an 0.2% formaldehyde solution a sufficiently firm gel within 25 minutes. After 16 minutes the mixture has the consistency of honey.

The gelatin and the formaldehyde solutions may be mixed either in the ampule containing the gelatin solution or in a syringe. When mixing in the amopule, it is advisable to add the formaldehyde solution to the gelatin solution and then rapidly mixing said solutions. When mixing in the syringe, first the gelatin solution is drawn up and thereafter the formaldehyde solution. Both solutions are then thoroughly mixed by means of an air bubble. However, on account of the high viscosity of the gelatin solution, very frequently this method of mixing does not give satisfactory results. Therefore, a metal ball is placed into the syringe the movements of which cause the two solutions to be readily, completely, and rapidly mixed with each other. The piston of the syringe is preferably provided with a recess so as to receive the metal ball and to allow quantitative injection of the contents of said syringe. In order to prevent adhesion of the ball to the piston, a small spring is provided at the bottom of the recess of said piston.

The retarding effect of a preparation according to this invention is readily demonstrated by the following experiment:

The dyestuff fluorescein, after administration to a guinea pig, is excreted almost quantitatively in the urine and can readily be detected by the fluorescence it imparts to urine, said fluorescence being visually observable. 2 cc. of a solution of fluorescein in water, containing 0.37 g. of said dyestuff in 100 cc., were subcutaneously injected into control animals. The animals were kept on a green fodder (herbage) diet so as to produce large amounts of urine. Their urine was collected every hour. It was found that urine collected after 5 hours to 7 hours did not show any fluorescence on observation in daylight. This indicates that all the fluorescein was excreted within 5 hours after administration.

2 cc. of a 23% gelatin solution containing 0.37% of fluorescein and mixed, before injection, with 0.2 cc. of a 2.8% formaldehyde solution, was injected subcutaneously into another animal. After 1 hour, fluorescence of the urine could be detected indicating that excretion of the dyestuff had already started. Fluorescence did not markedly diminish within the first 31 hours. Even after 44 hours, weak fluorescence could be detected, thus indicating that the depot produced by injecting a preparation according to this invention has a very remarkable prolonging effect.

A 16% gelatin solution and a 20% gelatin solution of the dyestuff were mixed with a formaldehyde solution as described above. The mixtures obtained thereby were administered, by intramuscular injection, to two other guinea pigs. The urine of these animals showed also strong fluorescence up to 29 hours whereafter it slowly disappeared.

In another experiment, a solution of fluorescein sodium in a 20% gelatin solution was intramuscularly injected into a rabbit. The urine did not exhibit any fluorescence after 7 hours, thus indicating that all the dyestuff was excreted. The same amount of a 20% gelatin solution containing the same amount of fluorescein but mixed, before injection, with a small amount of a 1% formaldehyde solution was injected into another rabbit. Even after 24 hours marked excretion of fluorescein could be detected in the urine.

These experiments prove that the depot effect of preparations according to this invention is quite remarkable. The dyestuff, although release from its depot starts a short time after injection, remains in the body about seven times longer than on administration in aqueous solution.

It is possible to combine the gelatin-formaldehyde depots with oil emulsions, i.e. to use oil emulsions in gelatin solutions which are then hardened by formaldehyde in the same manner as described with aqueous gelatin solutions. Thus, therapeutically effective compounds can be administered which are soluble in oils but are not soluble in water. In this case it is, however, advisable to somewhat reduce the viscosity of the gelatin solution. The amount of formaldehyde added need not be changed because, as far as has been found, it depends merely upon the amount of gelatin present in such preparations.

Intramuscular application apparently does not produce depots such prolonged activity as depots produced by subcaneous injection.

Another important application of depot preparations according to this invention consists in their use for filling body cavities and cavities produced by diseases, such as abscesses, bone cavities, tubercular caverns, and the like, with therapeutically effective compounds. It is known to drain and rinse such cavities by means of suitable medicamented solutions or to spray them with a medicamented powder. But such solutions and powders remain therein only for a short period of time and, therefore, have only a brief therapeutic effect. It is of great importance to provide preparations which, after introduction into such cavities, remain therein for a longer time. This is possible by using a depot preparation according to this invention and by filling the cavity therewith. Since the preparation is administered in the liquid state and solidifies only after introduction into the cavity, it is capable of filling out the entire cavity, whereafter it is converted into the solid state. Thereby, not only the advantage is achieved that the cavity is mechanically closed and sealed for a prolonged period of time, but that it is possible to introduce drugs in amounts which cannot be administered by other methods because, due to their rapid absorption, they would have a detrimental effect upon the body. A preparation according to this invention, however, does not release the drug rapidly and, therefore, much larger amounts of drugs, antiseptics, and the like, may be applied to the cavities. Since the cavity, in general, is not exposed to the action of the body fluids to such an extent as, for instance, the muscle, the further advantage is achieved that actually dissolution of the drug depot takes place at a comparatively slow rate, thereby further extending the effect of the drug.

A preparation according to this invention may also be injected into the uterus or into the bladder and the like. The new preparations, especially those containing the fibrinogen-thrombin system may furthermore be used for obliteration of varicose veins. It is evident that such new preparations may find extensive application in therapy in cases where prolonged activity of a medicament is essential or desirable.

Preparations of the type gelatin-quinone have proved to be especially effective, but other systems may be used likewise.

Fibrinogen may also be used for the purpose of this invention. Fibrinogen obtained from human blood is preferred. It may be prepared according to directions given, for instance, by Cohn, Strong, Hughes et al. in "Journ. Am. Chem. Soc.," vol. 68, page 459 (1946), or by Wunderly in "Helv. Chim. Acta," vol. 31, page 49 (1948).

Thrombin may be produced according to the instructions given by Seegers et al., "Journ. Biol. Chem.," vol. 123, page 751 (1938). The time of coagulation of fibrinogen by thrombin is influenced by the fibrinogen concentration, the thrombin concentration, the ion content of said solutions, the type of ions present, the presence of proteins, the pH-value, and others more. It may be retarded by various additions such as glycerol, salicylates, benzene sulfonates, and others. Increase in fibrinogen concentration while the thrombin concentration and all other conditions remain constant, increases coagulation time. Increase in thrombin concentration decreases coagulation time. Increase in ion concentration also increases coagulation time, whereby the type of ions present is of great importance. Some ions, such as citrate, phosphate, and the like ions, are capable of considerably retarding coagulation, even when present in small concentrations. Chloride ions (for instance, addition of sodium chloride to the fibrinogen solutions) also retard coagulation with increasing amounts. On the other hand, other ions, especially calcium ions, are capable of accelerating coagulation with increasing amounts. Contamination by proteins which, of course, should be avoided, especially when administering the new preparations to human patients, retards coagulation. Change in hydrogen ion concentration has also a remarkable influence upon coagulation. Neutral solutions show shortest coagulation time. With increasing pH-values and even more with decreasing pH-values, coagulation time increases. Glycerol has a strongly retarding effect upon coagulation. Temperature increases up to 30° C. cause decrease in coagulation time while above 30° C. coagulation is gradually retarded.

Fragility and elasticity of the resulting fibrin gel is closely connected with its power of retraction. Fragile and, therefore, less retractable fibrin gels are obtained by using higher fibrinogen concentrations. Addition of retarding agents, such as glycerol, is also capable of producing less retractable gels. It is, therefore, advisable, when using higher thrombin concentrations, to employ higher fibrinogen concentrations and to add retarding agents in order to prolong coagulation time. The onkotic pressure of the fibrin gel, thus, can be regulated by the addition of salts, colloids, such as gelatin, and others, so that it does not differ too much from that of the tissue.

The system fibrinogen-thrombin can be adjusted in such a manner that it is possible to produce compositions of different coagulation time. For instance, when increasing the fibrinogen concentration but keeping all other conditions constant, the coagulation time increases as will be seen from the following Table 3:

*Table 3*

| Fibrinogen concentration, percent | Coagulation time in minutes | |
|---|---|---|
| | 0.5 units of thrombin per cc. | 2 units of thrombin per cc. |
| 0.15 | 1.2 | 0.4 |
| 0.60 | 1.7 | 0.45 |
| 2.50 | 4.0 | 1.0 |

That increase in thrombin concentration decreases coagulation time, is shown by the following Table 4.

*Table 4*

| Units of thrombin per cc. of preparation: | Coagulation time in minutes |
|---|---|
| 0.05 | More than 12 |
| 0.4 | 3.8 |
| 0.9 | 2.1 |
| 1.7 | 1.2 |
| 3.3 | 0.6 |

The influence of ion addition to the fibrinogen-thrombin system is shown in the following Table 5 whereby sodium chloride is added to the fibrinogen-thrombin solution:

*Table 5*

| Sodium chloride concentration expressed in normality: | Coagulation time in minutes |
|---|---|
| 0.1 | 0.8 |
| 0.2 | 1.5 |
| 0.3 | 2.2 |
| 0.4 | 3.6 |
| 0.5 | 4.3 |
| 0.6 | 6.0 |

The effect of hydrogen ion concentration upon coagulation time is demonstrated in the following Table 6. It is shortest at a pH of 7.0, but increases with decreasing pH-values.

*Table 6*

| pH: | Coagulation time in minutes |
|---|---|
| 6.9 | 2.1 |
| 6.6 | 3.2 |
| 6.3 | 5.0 |

The retarding effect of glycerol is shown in the following Table 7.

*Table 7*

| Glycerol addition in percent: | Coagulation time in minutes |
|---|---|
| 0.00 | 1.5 |
| 0.12 | 3.2 |
| 0.50 | 7.0 |

The influence of temperature increase is shown in the following Table 8.

Table 8

| Temperature in °C.: | Coagulation time in minutes |
|---|---|
| 10 | 1.5 |
| 20 | 0.6 |
| 30 | 0.4 |
| 40 | 0.5 |

In the place of thrombin, there may be used other substances to cause coagulation of fibrinogen, for instance, ninhydrin (triketo hydrindene hydrate), salicylic aldehyde, alloxan, and others. Although ninhydrin has some toxic effect, it is used in such small amounts (0.1–1.0 mg. per 1 g. of fibrinogen) that it cannot exert any unfavorable effect upon the body.

Since fibrinogen and thrombin are stable only in the solid dry state, the best way to store a fibrinogen-thrombin preparation according to this invention is to keep fibrinogen in an ampoule, thrombin in another ampoule, and the aqueous solution which may contain the accelerating or retarding agents, buffering compounds, and the like, in a third ampoule. Shortly before injection fibrinogen is first dissolved whereafter the fibrinogen solution is added to thrombin, and, after thorough mixing, the mixture is injected into the body. The therapeutically effective compound may be added to the fibrinogen or to the thrombin or it may be dissolved or suspended in the solvent solution or it may even be added after mixing fibrinogen and thrombin. It is, of course, also possible to place fibrinogen, thrombin, and the drug into the same ampoule, especially if a fibrinogen is selected which has about the same solubility properties as thrombin, and to add thereto the solvent solution, whereafter the mixture is thoroughly mixed until all the fibrinogen and thrombin are dissolved. The solution or suspension of the drug in said fibrinogen-thrombin solution can then be injected.

Formaldehyde, for gelatin hardening, is used in such small amounts that no toxic effects need be feared. Furthermore, substantially all of said formaldehyde is combined with the gelatin.

Chromium$^{III}$-compounds can also be used as gelling agents in very small amounts so that no toxic effect will be caused. It is advisable, when using chromium compounds as hardening agents, to add local anesthetics to the preparation because usually injections of chromium compounds are somewhat painful.

Chromium ions are added by using a solution of a suitable chromium salt, such as chrome alum in the form of a 1% solution corresponding to an 0.1% solution of chromium$^{III}$ ions. Such a dilute solution, however, must be stabilized, for instance, by the addition of neutral salts, in order to retard hydrolysis. Acid addition is also capable of increasing the stability of such solutions; but a gel produced by means of such an acid-stabilized solution liquefies after a few hours. Therefore, such a solution can be used for very specific purposes only. The hardening time is shortened with increasing chromium ion concentration.

As cobalt compounds there are used with great success cobaltitriamine complex compounds. They are without toxic effect when applied in the small amounts required to cause hardening of gelatin.

When using cobalt in the form of the so-called "dichro ammino cobaltichloride of the formula

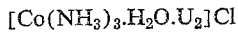

$$[Co(NH_3)_3 \cdot H_2O \cdot U_2]Cl$$

it is necessary to retard hardening because a gel forms immediately on addition of said compound. For this purpose, potassium thiocyanate is added to the gelatin solution. The more potassium thiocyanate is present, the more slowly proceeds the hardening process and the more dichro chloride is necessary. Adding acids, such as hydrochloric acid, to the dichro chloride solution also retards gelling, but the gel formed liquefies within a comparatively short time as with chromium compounds. Other cobalt triammine complex compounds than the dichro chloride may also be used. All these cobalt complex salts, however, form rather unstable solutions. Therefore, such solutions have to be freshly prepared and must be stored in the dark, in order to retard hydrolysis. Hydrolysis of such solutions may be suppressed for a few days by the addition of ammonium chloride, gum arabic, organic dyestuffs, such as methylene blue and the like.

Aluminum compounds may also be used as hardening agents. They form immediately after addition, a gel with gelatin. Therefore, gel formation retarding agents must be added. Aluminum compounds are especially suitable on account of their very low toxicity.

Hardening by metal compounds, generally, does not produce depots of very long duration. Usually depots of 24 hours duration are obtained. When adding sympathomimetic agents, such as adrenalin, synephrin tartrate, and other compounds of this type, to preparations containing metal compounds as hardening agents, the flow of body fluid is reduced and, therefore, less drug is absorbed due to contraction of the blood vessels.

Quinone is capable of forming a very stable gel with gelatin which remains in the body for a very long time. The small amounts of quinone used (about 10 mg. of quinone for 2 cc. of gelatin solution) are harmless.

Such quinone-gelatin depots are very hard and are slowly dissolved by the body fluids when injected subcutaneously. Their prolonged effect may last for several weeks. Another advantage of quinone is that it causes hardening of relatively dilute gelatin solutions, such as solutions containing only 12% of gelatin. Such solutions are quite liquid and, therefore, are especially suitable for injection. One disadvantage of quinone-hardened gelatin gels is their discoloration. The solution starts to acquire a yellowish to brownish color shortly after addition of the quinone. It is also possible to add quinone in solid form to gelatin solutions because it is readily dissolved by such solutions. Like quinone there may be used quinhydrone which requires, of course, larger amounts.

It is possible to combine various hardening and coagulating agents, such as, for instance, chromium compounds and formaldehyde. The chromium compound forms the gel rapidly while the formaldehyde has a much slower hardening effect, especially when the gelatin solution is not alkaline, but yields a hard gel. Such a mixture of hardening agents is especially suitable for hardening a slightly acid gelatin solution.

Such slightly acid gelatin solutions are often required because various drugs are not stable in alkaline gelatin solutions. An acid gelatin solution, however, requires for hardening a very long time, often days. In such a case the use of a mixture of hardening agents of rapid action, such as a chromium salt solution, and of slow action, such as formaldehyde, has been of great advantage. It is, of course, also possible to add a slightly alkaline formaldehyde solution, which, however, is not very stable, or an alkaline formaldehyde compound to the gelatin solution. One may also add formaldehyde to the gelatin solution and thereafter start the hardening process by the addition of a buffer solution capable of producing a slightly alkaline reaction. Of course, the gelatin solution should not become too acid in order to avoid any hydrolytic decomposition thereof.

Of course, other hardening and tanning agents may also be used for the purpose of this invention although formaldehyde represents the preferred hardening agent.

The therapeutically effective compound and the two components, namely the coagulating or solidifying agent and the material capable of solidifying or coagulating under the influence of such agents, are mixed and combined, shortly and immediately before injection, by the physician or the person administering the new preparation. In the case of gelatin, it is advisable to heat the gelatin solution to about 30–35° C. Solidification starts already in vitro. It must be retarded to such an extent that injection of the solution by an ordinary injection needle is possible. This increase in viscosity of a gelatin solution to which formaldehyde was added, may be observed in vitro by inserting a glass rod into the mixture and withdrawing said glass rod after a certain period of time. In all cases, a filament-like structure adheres to the end of the rod, said filament becoming thicker and thicker with increasing viscosity. Finally the viscosity is so high and hardening has proceeded to such an extent, that the entire viscous content together with the test tube can be lifted when trying to withdraw the glass rod. The gel, thereafter, does not change its form and surface.

A gelatin-formaldehyde mixture according to the present invention is injected when the viscosity has not yet increased considerably, usually immediately after mixing of the components. Concentration of the components and other additions and conditions are adjusted in such a manner that the gel is formed within 6 minutes to 25 minutes. It has been found that such a mixture, on injection, although the gel is not formed, has attained such a viscosity that almost none of the drug is dissolved and removed by the body fluids after injection. Addition of adrenalin or a compound of similar activity to prevent premature absorption of the drug due to its contracting effect upon the blood vessels, is of advantage. Gelatin of low molecular weight may also be used. Such a gelatin is, for instance, obtained by degradation of commercially available gelatin. Such a gelatin of lower molecular weight, for instance, of a molecular weight of 20,000 is converted into the desired depot gel by the addition of formaldehyde or other hardening agents to which accelerators such as polyvalent phenols, for instance, phloroglucinol are added.

It is, of course, possible to prepare combinations according to this invention, which allow the physician to wait for 10 minutes to 30 minutes after mixing, before injecting the mixture. But it had proved the preferred procedure to inject the mixture immediately after mixing and, therefore, to adjust concentration and other conditions accordingly.

Potassium thiocyanate is the preferred agent for regulating the viscosity of the gelatin solutions, but other agents, such as magnesium chloride, calcium chloride, and others, may be used likewise.

Small amounts of calcium ions (0.5–0.8%) or larger amounts of magnesium ions have the same reducing effect upon the viscosity. Magnesium ions are of advantage because they can be injected in very large amounts without causing any side-effects. On the contrary, magnesium exerts a good local anesthetic effect and, therefore, is capable of eliminating any irritation caused by the hardening agent. Organic compounds, such as furfuryl alcohol in amounts of 2–5%, are also capable of reducing the viscosity of gelatin solutions.

Iodine ions may also be used; but, of course, they are not entirely harmless. Potassium cyanate may be added in amounts up to about 5%, calcium chloride in amounts up to 4%, magesium sulfate or magnesium chloride in amounts up to 50%.

In place of formaldehyde, it is possible to employ formaldehyde which has already reacted with gelatin. Such a material is obtained, for instance, by treating a dry gelatin powder in the cold with a formaldehyde solution (2% formaldehyde), drying the treated gelatin in a vacuum, and comminuting the dried product to a powder. When adding such a powder to a gelatin solution, the gelatin therein is also hardened.

Formaldehyde may also be used in the form of a solid compound which yields free formaldehyde under the influence of a gelatin solution or of changes in the reaction conditions, for instance, by a rise in temperature. As such formaldehyde compound there may advantageously be employed, for instance, anhydromethylene citrate which splits off formaldehyde at a temperature of 37° C. It is even possible to place a solid formaldehyde compound which is stable in the dry state and a dry gelatin powder into the same ampoule and to add an aqueous solution or suspension of the drug to said dry mixture to dissolve the gelatin and the formaldehyde compound and to cause hardening.

When using coagulating or hardening agents which might react with the therapeutically effective compound, it is advisable to employ said compounds in a solid state or in a difficultly and slowly soluble form. For instance, when using insulin as therapeutically effective compound, it is preferably employed in the form of its difficultly soluble compounds, such as protamine-insulin, hexamethylenetetramine-insulin, and the like. Formaldehyde will then react much quicker with the free amino groups of the gelatin than with the insulin complex.

The system fibrinogen-thrombin may be used for most drugs. Of course, when administering, for instance, heparin or the like compounds which prevent coagulation of the fibrinogen-thrombin system, it is advisable to use other coagulating agents, such as ninhydrin or salicylic aldehyde, in the place of thrombin.

When using the system fibrinogen-thrombin, the depot formed remains in the tissue for a very long period of time provided the drug is added in the form of a colloidal solution, a suspension, or an emulsion, i.e. if the drug is not substantially dissolved by diffusion or by being squeezed out by contraction of the fibrin gel formed. Such a fibrin gel depot may exert its activity for one week to two weeks or even longer. If, however, the drug is present in the form of a crystalloidal substance, it is usually dissolved and/or squeezed out of the fibrin gel within one day to two days while the fibrin gel remains in the body for a longer period of time. The same is true for other systems. Diffusion of a crystalloidal drug is also dependent upon the compactness of the gel.

The prolonged effect of a depot, according to the present invention, is furthermore dependent upon other factors, such as injected volume, shape of the gel within the tissue, i.e. its surface, place of injection in relation to the flow of the body fluids, etc. Repeated application might cause more rapid dissolution of a gel. When using the system gelatin-formaldehyde or other hardening agents, the prolonged effect of the gel increases with increasing concentration of gelatin and/or formaldehyde. When producing a depot by intramuscular injection, it is advisable to employ higher concentrations of the hardening agent because in this instance, the gel is more rapidly dissolved. Formaldehyde gels remain effective for days but quinone gels for weeks.

As stated above, when using a liquid and a solid component in separate ampoules, the liquid, immediately before injection, is added to the solid or, vice versa, the solid to the liquid. Two liquid components may either be mixed by adding the one to the other and mixing them outside the syringe or both may be withdrawn from the ampoules and may be mixed within the syringe.

The following examples serve to illustrate the present invention without, however, limiting the same thereto.

*Example 1*

2 cc. of an aqueous solution containing 0.4 g. of gelatin, 0.1 g. of potassium thiocyanate, 14 mg. of calcium chloride, and, suspended therein, 100 mg. of estradiol benzoate, are filled into ampoule A. Another ampoule B contains 4 mg. of formaldehyde in 0.5 cc. of water. Both ampoules are heated to about body temperature. The contents of the formaldehyde ampoule B are added to the contents of the other ampoule A and the combined solutions are quickly but thoroughly mixed. The mixture is withdrawn by means of a syringe and is immediately injected. At the place of injection, a depot of the estrogenic hormone is formed due to hardening of the gelatine which takes place within a few minutes.

Example 2

Ampoule A: 0.3 g. of meperidine hydrochloride dissolved in 2 cc. of a 17% gelatin solution containing 0.2 g. of potassium thiocyanate.

Ampoule B: 0.4 mg. of chromium in the form of 4 mg. of chrome alum and 50 mg. of sodium chloride are dissolved in 0.5 cc. of water.

A depot of merperidine is produced by proceeding in the same manner as described in the preceding example.

Example 3

Ampoule A: 0.3 g. of meperidine hydrochloride are dissolved in 5 cc. of water. The pH-value of said solution is adjusted to a pH of 7.0 by the addition of sodium hydroxide solution. The resulting solution is filled up to 5 cc.

Ampoule B contains 0.3 g. of fibrinogen in its dry powdered form.

Ampoule C: 10 units of thrombin in dry powdered form.

The contents of ampoule A are added to the fibrinogen ampoule and shaken until all the fibrinogen is dissolved. Thereafter the solution is heated to body temperature and is added to ampoule C containing the thrombin and is shaken until a clear solution is obtained. The mixture is immediately injected, producing a depot of meperidine of prolonged activity.

Example 4

Ampoule A: 0.5 g. of meperidine base are suspended in 5 cc. of a 5% gelatin solution. The pH-value of said suspension is adjusted to about 8.0 by the addition of sodium hydroxide solution.

Ampoule B contains 0.2 g. of fibrinogen and 2.5 units of thrombin, both substances in dry powdered form.

Shortly before injection the contents of ampoule A are added to the dry powder of ampoule B. The mixture is shaken until the fibrinogen and thrombin are completely dissolved, and is then injected. A depot of meperidine of prolonged activity is produced thereby.

Example 5

Ampoule A contains 5 cc. of a phosphate buffer solution of a pH of 7.8.

Ampoule B contains 0.3 g. of fibrinogen in dry powdered state.

Ampoule C contains 5 units of thrombin and 1.0 g. of meperidine base.

First the contents of ampoule A are added to ampoule C until the thrombin is dissolved and the meperidine base is finely suspended throughout the solution. Said suspension, immediately before injection, is added to the contents of ampoule B and is thoroughly mixed therewith whereafter the suspension is injected. A meperidine depot of prolonged activity is produced thereby.

Example 6

Ampoule A: 0.08 g. of morphine base are suspended in 2 cc. of a 20% gelatin solution containing 15 mg. of calcium chloride.

Ampoule B: 0.5 mg. of chromium corresponding to 5 mg. of chrome alum.

Shortly before injection, the chrome alum in ampoule B is dissolved in 0.5 cc. of water. The solution is added to the suspension of ampoule A and is thoroughly mixed therewith. The ampoules were previously heated to about 36° C. As soon as complete mixture is achieved, the suspension is injected forming a morphine depot of prolonged activity.

Example 7

Ampoule A: 0.1 g. of morphine base are suspended in 3 cc. of a 16% gelatin solution containing 90 mg. of potassium thiocyanate and 15 mg. of calcium chloride.

Ampoule B: 0.6 mg. of chromium corresponding to 6 mg. of chromic alum, 4 mg. of formaldehyde, and 25 mg. of sodium chloride, dissolved in 0.5 cc. of water.

The two solutions are withdrawn into a syringe wherein they are thoroughly mixed. On injection, the mixture forms a morphine depot of prolonged activity.

Example 8

Ampoule A: 0.2 g. of morphine base are suspended in 6 cc. of a 5% gelatin solution being adjusted, by the addition of sodium hydroxide solution, to a pH of about 7.8.

Ampoule B contains 0.3 g. of fibrinogen and 3 units of thrombin in dry powdered form.

The contents of ampoule A are added, immediately before injection, to ampoule B and are thoroughly mixed therewith. Thereafter the mixture is injected and forms a morphine depot of considerably prolonged activity. Preparations containing morphine or other narcotics are of considerable importance inasmuch as their depot effect prevents the patient reaching the euphoric stage. As a result thereof the danger of addiction is considerably reduced.

Example 9

Ampoule A: 0.5 g. of codeine phosphate are dissolved in 2 cc. of a 15% gelatin solution containing 0.1 g. of potassium thiocyanate.

Ampoule B: 0.5 mg. of chromium corresponding to 5 mg. of chrome alum, dissolved in 0.5 cc. of water.

The two solutions are withdrawn from their ampoules into a syringe and are thoroughly mixed therein. After injection, a depot of codeine phosphate of considerably prolonged activity is obtained.

Example 10

Ampoule A: 0.1 g. of dihydrocodeinone base are suspended in 4 cc. of a 20% gelatin solution containing 20 mg. of calcium chloride and 0.1 g. of potassium thiocyanate.

Ampoule B: 6 mg. of chromium corresponding to 60 mg. of chrome alum, and 6 mg. of formaldehyde are dissolved in 0.5 cc. of water.

A depot of dihydrocodeinone is produced in the same manner as described in the preceding examples.

Example 11

Ampoule A: 100 mg. of dibucaine hydrochloride are dissolved in 2 cc. of a phosphate buffer solution having a pH of about 7.0. 10 mg. of glycerol are added to said solution.

Ampoule B: 100 mg. of fibrinogen, about 2 units of thrombin, and 25 mg. of sodium benzoate, all in dry powdered state. The contents of ampoule A are transferred to ampoule B and are thoroughly mixed therewith until completely dissolved. Immediately thereafter, the mixture is injected and forms a depot of the local anesthetic.

Example 12

Ampoule A: 2.2 cc. of a 1% solution of sodium benzoate adjusted to a pH of about 7.0.

Ampoule B: 80 mg. of fibrinogen in dry powdered form.

Ampoule C: 1 unit of thrombin and 50 mg. of dibucaine hydrochloride, both substances in dry powdered form.

The contents of ampoule A are first added to ampoule B and shaken until the fibrinogen is dissolved. The solution is then added to ampoule C and again shaken to dissolve the thrombin and local anesthetic agent. The mixture is immediately injected forming a depot of said local anesthetic agent.

Example 13

Ampoule A: A 2% solution of dibucaine base in 2 cc. of olive oil is emulsified in 5 cc. of a 5% gelatin solution.

Ampoule B: 7 units of thrombin in dry powdered form.

Ampoule C: 0.2 g. of fibrinogen in dry powdered form.

Shortly before injection, ampoule A is mixed with ampoule B and the mixture is transferred to ampoule C. Thereafter, the contents of said ampoules are thoroughly mixed and injected.

Example 14

Ampoule A: 22 mg. of tetracaine hydrochloride and 7.0 mg. of glycerol are dissolved in 2.2 cc. of an 0.3 N phosphate buffer solution.

Ampoule B: 100 mg. of fibrinogen and 5 units of thrombin, both substances in dry powdered form.

Ampoule A is added to ampoule B and the mixture, after complete solution is achieved, is injected to form a tetracaine depot.

Example 15

Ampoule A: 10 cc. of a 10% gelatin solution containing 1.0 g. of procaine hydrochloride and being adjusted, by means of acetate buffer solution, to a pH of about 7.0.

Ampoule B: 200 mg. of fibrinogen in dry powdered form.

Ampoule C: 2.5 units of thrombin in dry powdered form.

The contents of ampoule A are added to ampoule B and, after fibrinogen is dissolved, to ampoule C. As soon as thrombin is dissolved, the mixture is injected to form a depot of procaine. The gelatin addition to the fibrinogen-thrombin solution has the advantage that the gel concentration is increased and the diffusion of procaine is furthermore retarded.

Example 16

Ampoule A: 3 cc. of a 15% gelatin solution containing 150 mg. of procaine hydrochloride and 0.1 g. of potassium thiocyanate.

Ampoule B: 0.5 cc. of an aqueous solution containing 0.7 mg. of chromium in the form of 7 mg. of chrome alum and 0.1 g. of sodium chloride.

The solutions are mixed in a syringe and are injected immediately after mixing, forming a deposit of procaine in the body. This preparation, on account of its chromium content, should not be used for nerve block anesthesia.

In a similar manner as described in the preceding examples, other local anesthetics may be used, such as butethamine hydrochloride or formate, butacaine sulfate, diperodon hydrochloride, lidocaine hydrochloride, naepaine hydrochloride, phenacaine hydrochloride, piperocaine hydrochloride, and the bases derived therefrom, and others more. In the case of anesthetic agents of the type of primary amines, it is advisable to use such solidifying or hardening agents which do not react with the primary amino groups while with tertiary and secondary amines such reactions are not to be feared.

Example 17

Ampoule A: 2 cc. of a 20% solution of camphor in peanut oil are emulsified in 5 cc. of a 15% gelatin solution containing 35 mg. of calcium chloride.

Ampoule B: 1 cc. of an aqueous solution containing 0.1% of chromium in the form of chrome alum.

Solution B is added, while stirring thoroughly, to emulsion A, thereby yielding a mixture which, on injection, produces a camphor depot in the body.

Example 18

Ampoule A: 4 cc. of camphor liniment (U.S. Pharmacopoeia XIV) are emulsified in 4 cc. of a 12% gelatin solution containing 0.8 g. of magnesium chloride.

Ampoule B: 0.6 cc. of an aqueous solution of 1.0 mg. of chromium in the form of chrome alum.

The contents of ampoules A and B are mixed in a syringe and are then injected, thereby forming a depot of camphor.

Example 19

Ampoule A: 1 g. of camphor is finely suspended in 5 cc. of a 10% gelatin solution.

Ampoule B: 0.2 g. of fibrinogen in dry powdered form.

Ampoule C: 5 units of thrombine in dry powdered form.

The camphor suspension of ampoule A is added to ampoule B. After fibrinogen is completely dissolved, the mixture is added to ampoule C and is injected as soon as thrombine is dissolved, thereby forming a camphor depot.

Example 20

Ampoule A: 0.4 g. of methyl isopropyl cyclohexenone (hexetone) are emulsified in 3 cc. of a 16% gelatin solution containing 90 mg. of potassium thiocyanate.

Ampoule B: 0.5 cc. of an aqueous solution containing 0.6 mg. of chromium in the form of chrome alum.

Both ampoule contents are mixed in a syringe and are injected immediately after mixing, forming a depot of said analeptic agent.

Example 21

Ampoule A: 2 cc. of a 16% gelatin solution containing 0.1 g. of potassium thiocyanate and 0.2 g. of pentylene tetrazole.

Ampoule B: 0.5 cc. of an aqueous solution containing 0.5 mg. of chromium in the form of chrome alum.

Both solutions are mixed in a syringe and are then administered to form a pentylene tetrazole depot.

Example 22

Ampoule A: 3 cc. of a 16% gelatin solution containing 0.3 g. of pentylene tetrazole, 0.15 g. of a mixture of caffeine and sodium salicylicum (1:1), and 90 mg. of potassium thiocyanate.

Ampoule B: 0.5 cc. of an aqueous solution containing 0.7 mg. of chromium in the form of chrome alum.

Mixing and administration of this preparation is carried out as described in the preceding examples.

Example 23

Ampoule A: 10 cc. of a 20% gelatin solution containing 2.5 g. of nikethamide, 50 mg. of calcium chloride, and 0.3 g. of potassium thiocyanate.

Ampoule B: 0.5 cc. of an aqueous solution containing 0.5 mg. of chromium in the form of chrome alum. 5 ampoules B are provided for 1 ampoule A.

2 cc. of ampoule A are mixed in the syringe with 0.5 cc. of ampoule B and the mixture is then injected to form a nikethamide depot in the body.

Example 24

Ampoule A: 4 mg. of strychnine nitrate are dissolved in 2 cc. of a 15% gelatin solution containing 0.2 g. of magnesium chloride.

Ampoule B: 0.5 cc. of an aqueous solution containing 0.5 mg. of chromium in the form of chrome alum and 50 mg. of sodium chloride.

Both ampoule contents are mixed and administered as described in the preceding examples to produce a strychnine depot.

Example 25

Ampoule A: 8 mg. of strychnine are dissolved in 4 cc. of a 16% gelatin solution containing 20 mg. of calcium chloride.

Ampoule B: 0.6 cc. of an aqueous solution of 0.6 mg. of chromium in the form of chrome alum, 5 mg. of formaldehyde, and 60 mg. of sodium chloride.

Both ampoule contents are mixed and administered as described in the preceding examples to produce a strychnine depot.

Example 26

Ampoule A: 2 cc. of a 20% gelatin solution containing digitalis glycosides corresponding to 0.2 g. of digitalis, and 0.2 g. of magnesium chloride.

Ampoule B: 0.5 cc. of an aqueous solution containing 0.5 mg. of chromium in the form of chrome alum and 25 mg. of sodium chloride.

The two solutions are mixed and injected subcutaneously to form a depot of digitalis glycosides.

Example 27

Ampoule A: 0.1 mg. of ouabain, 5 mg. of tetracaine hydrochloride, and 0.1 g. of potassium thiocyanate are dissolved in 2 cc. of a 15% gelatin solution.

Ampoule B: 0.5 cc. of an aqueous solution containing 0.5 mg. of chromium in the form of chrome alum, and 25 mg. of sodium chloride.

Both solutions are mixed and administered as described in the preceding examples to produce an ouabain depot.

Example 28

Ampoule A: 0.2 mg. of ouabain, 10 mg. of dibucaine hydrochloride, and 0.2 g. of magnesium sulfate are dissolved in 2 cc. of an 18% gelatin solution.

Ampoule B: 0.5 cc. of an aqueous solution containing 0.3 mg. of chromium in the form of chrome alum, 4 mg. of formaldehyde, and 50 mg. of sodium chloride.

Both solutions are mixed in the syringe and immediately injected subcutaneously to produce a depot of ouabain.

Example 29

Ampoule A: 0.1 g. of heparin sodium and 60 mg. of potassium thiocyanate are dissolved in 2 cc. of a 15% gelatin solution.

Ampoule B: 0.3 cc. of an aqueous solution containing 0.5 mg. of chromium in the form of chrome alum.

Both solutions are mixed in the syringe and are then injected subcutaneously to produce a depot of heparin which slowly and gradually releases the heparin over a considerably more prolonged period of time than heretofore possible.

Example 30

Ampoule A: 0.1 g. of bis-hydroxy coumarin and 30 mg. of potassium thiocyanate are dissolved in 2 cc. of a 20% gelatin solution.

Ampoule B: 0.3 cc. of an aqueous solution containing 0.3 mg. of chromium in the form of chrome alum and 15 mg. of sodium chloride.

Both solutions are mixed in a syringe and are then injected intramuscularly to produce a depot of bis-hydroxy coumarin.

Other anticoagulants may be used likewise.

Example 31

Ampoule A: 300 mg. of methyl testosterone are suspended in 5 cc. of a 5% gelatin solution containing 10 mg. of glycerol.

Ampoule B: 0.2 g. of fibrinogen in dry powdered form.

Ampoule C: 7.5 units of thrombin in dry powdered form.

The contents of ampoule A are added to ampoule B and, after fibrinogen is dissolved, to ampoule C, whereupon the mixture is injected intramuscularly to form a depot of methyl testosterone.

Example 32

Ampoule A: 300 mg. of testosterone are finely suspended in 3 cc. of a 15% gelatin solution containing 20 mg. of calcium chloride.

Ampoule B: 10 mg. of benzoquinone in dry powdered form.

The contents of ampoule A are added to ampoule B and, after thorough mixing, the mixture is injected to form a depot of testosterone.

Example 33

Ampoule A: 50 mg. of testosterone propionate dissolved in 1 cc. of olive oil, are emulsified in 4 cc. of an 18% gelatin solution containing 160 mg. of potassium thiocyanate.

Ampoule B: Contains 20 mg. of toluquinone.

First toluquinone is dissolved by adding 1.0 cc. of distilled and sterile water to ampoule B. To said solution the content of ampoule A is given and rapidly and thoroughly mixed therewith. On injecting the mixture, a depot of testosterone propionate is obtained.

Example 34

Ampoule A: 25 mg. of estradiol benzoate are suspended in 5 cc. of a 10% gelatin solution containing 150 mg. of sodium chloride, and 5 mg. of glycerol.

Ampoule B: 0.2 g. of fibrinogen and 10 units of thrombin, both substances in dry powdered form.

The contents of ampoule A are mixed with the dry powder in ampoule B to dissolve said substances. The mixture is then injected intramuscularly to form an estradiol benzoate depot of considerably prolonged activity.

Example 35

Ampoule A: 100 mg. of ethinyl estradiol are suspended in 5 cc. of a 16% gelatin solution.

Ampoule B: Contains 24 mg. of benzoquinone.

The contents of ampoule A are added to ampoule B and, after benzoquinone is dissolved, the mixture is injected to form a depot of ethinyl estradiol.

Example 36

Ampoule A: 100 mg. of diethyl stilbestrol dipropionate are suspended in 6 cc. of a 10% gelatin solution containing 18 mg. of glycerol.

Ampoule B: 0.2 g. of fibrinogen and 12 units of thrombine, both substances in dry powdered form.

The suspension in ampoule A is added to ampoule B and, after solution has taken place, the mixture is injected to form a diethyl stilbestrol dipropionate depot.

Example 37

Ampoule A: 50 mg. of estradiol dipropionate are dissolved in 1 cc. of sesame oil. Said solution is emulsified in 5 cc. of a 5% gelatin solution containing 25 mg. of glycerol.

Ampoule B: 0.3 g. of fibrinogen and 9 units of thrombin, both substances in dry powdered form.

The contents of ampoule A are added to ampoule B and the emulsion obtained on thorough mixing is injected to form a depot of estradiol dipropionate.

Example 38

Ampoule A: 50 mg. of progesterone are dissolved in 1 cc. of olive oil. Said solution is emulsified in 4 cc. of a 1% gelatin solution.

Ampoule B: 0.2 g. of fibrinogen and 3 units of thrombin, both substances in dry powdered form.

The contents of ampoule A are added to ampoule B and are mixed thoroughly therewith whereafter the mixture containing the dissolved fibrinogen and thrombin is injected to produce a depot of progesterone.

Example 39

Ampoule A: 150 mg. of progesterone are finely suspended in 6 cc. of a 10% gelatin solution containing 20 mg. of glycerol.

Ampoule B: 0.2 g. of fibrinogen in dry powdered form.

Ampoule C: 10 units of thrombin in dry powdered form.

The contents of ampoule A are added to and intimately mixed with the contents of ampoule B and the mixture thereof is added to and thoroughly mixed with the contents of ampoule C. The mixture is then injected to form a depot of progesterone.

Example 40

Ampoule A: 250 mg. of progesterone are finely suspended in 3 cc. of a 20% gelatin solution.

Ampoule B: 20 mg. of benzoquinone in dry powdered form.

The contents of ampoule A are added to ampoule B and are thoroughly mixed therewith. The mixture obtained is injected to form a depot of progesterone.

*Example 41*

Ampoule A: 50 mg. of desoxycorticosterone acetate are finely suspended in 5 cc. of a 20% gelatin solution.

Ampoule B: 20 mg. of benzoquinone in dry powdered form.

The contents of ampoule A are added to ampoule B and are intimately mixed therewith until the benzoquinone is dissolved. Immediately thereafter, the mixture is injected to form a depot of desoxycorticosterone acetate.

*Example 42*

Ampoule A: 100 mg. of cortisone are suspended in 8 cc. of a 2% gelatin solution containing 25 mg. of glycerol.

Ampoule B: 0.4 g. of fibrinogen in dry powdered form.

Ampoule C: 15 units of thrombin in dry powdered form.

First the contents of ampoule A are added to ampoule B. After completely dissolving the fibrinogen, the mixture is added to ampoule C and is then, after dissolving the thrombin, injected to form a cortisone depot of considerably prolonged activity.

*Example 43*

Ampoule A: 6 cc. of a phosphate buffer solution having a pH-value of about 7.0.

Ampoule B: 0.4 g. of fibrinogen in dry powdered form.

Ampoule C: 2000 units of chorionic gonadotropin and 10 units of thrombin, both substances in dry powdered form.

The contents of ampoule A are added to ampoule B and the fibrinogen is dissolved therein. The mixture is added to ampoule C and, after solution has taken place, is injected to form a depot of chorionic gonadotropin.

*Example 44*

Ampoule A: 5 cc. of a phosphate buffer solution having a pH-value of about 7.0.

Ampoule B: 0.3 g. of fibrinogen and 5000 units of chorionic gonadotropin, both substances in dry powdered form.

Ampoule C: 1 cc. of the same buffer solution containing 20 mg. of glycerol.

Ampoule D: 10 units of thrombin in dry powdered form.

First the contents of ampoules A and B are combined and the solid substances are dissolved. The contents of ampoules C and D are combined to dissolve thrombin. Thereafter the two solutions are withdrawn into a syringe and are intimately mixed therein. The mixture is then injected to form a depot of chorionic gonadotropin.

*Example 45*

Ampoule A: 5 cc. of a phosphate buffer solution having a pH-value of about 7.0 and containing 15 mg. of glycerol.

Ampoule B: 0.3 g. of fibrinogen, 20 units of vasopressin tannate, and 12.5 units of thrombin, all these substances in dry powdered form.

The contents of ampoule A are added to ampoule B and are thoroughly mixed therewith. Thereafter, the mixture is injected and produces a depot of vasopressin.

*Example 46*

Ampoule A: 3 cc. of a buffer solution having a pH-value of about 7.0 and containing 12 mg. of glycerol.

Ampoule B: 0.1 g. of fibrinogen, 2 units of thrombin, and 50 mg. of adrenocorticotropic hormone of the pituitary gland, all these substances in dry powdered form.

The contents of ampoule A are added to ampoule B and the mixture is, after complete solution has taken place, immediately injected forming a depot of said adrenocorticotropic hormone.

*Example 47*

Ampoule A: 0.05 g. of fibrinogen, 2 units of thrombin, and 200 units of zinc insulin crystals (with about 0.75% of zinc), all these substances in dry powdered form.

Ampoule B: 3 cc. of a phosphate buffer solution having a pH-value of about 7.0.

The contents of ampoule B are added to ampoule A and the mixture, after thoroughly mixing, is injected to form an insulin depot of considerably prolonged activity.

*Example 48*

Ampoule A: 1 cc. of a suspension of 300,000 units of procaine penicillin G in peanut oil is emulsified in 2 cc. of a 5% gelatin solution.

Ampoule B: 0.2 g. of fibrinogen in dry powdered form.

Ampoule C: 6 units of thrombin in dry powdered form.

The contents of ampoule A are added to ampoule B. As soon as fibrinogen is dissolved, the mixture is added to ampoule C and is again intimately mixed until thrombin is dissolved. Immediately thereafter, the mixture is injected producing a depot of penicillin.

*Example 49*

Ampoule A: 4 cc. of a 2% procaine solution.

Ampoule B: 0.1 g. of fibrinogen, 2 units of thrombin, and 2,000,000 units of procaine penicillin G, all these substances in dry powdered form.

The contents of ampoule A are added to ampoule B and are intimately mixed therewith. Injection of the mixture produces a penicillin depot of considerably prolonged activity.

*Example 50*

Ampoule A: 10 cc. of a 20% gelatin solution containing about 0.5 g. of potassium thiocyanate.

Ampoule B: 3 g. of streptomycin sulfate in dry powdered form.

Ampoule C: 2.5 cc. of an aqueous solution containing 2.5 mg. of chromium in the form of chrome alum and 250 mg. of sodium chloride.

Ampoules A and B are mixed with each other and the mixture is added to ampoule C. After intimately mixing, the mixture is injected, producing a depot of streptomycin of considerably prolonged activity.

*Example 51*

Ampoule A: 2 cc. of a 10% gelatin solution.

Ampoule B: 250 mg. of aureomycin hydrochloride in dry powdered form.

Ampoule C: 50 mg. of fibrinogen and 1 unit of thrombin, both substances in dry powdered form.

The contents of ampoules A and C are mixed with each other. The mixture is added to ampoule B and vigorously shaken. On injecting the resulting mixture, a depot of aureomycin is produced.

*Example 52*

Ampoule A: 3 cc. of a 3% gelatin solution, being adjusted to a pH of about 7.0

Ampoule B: 0.1 g. of fibrinogen, 1.5 units of thrombin, 300,000 units of crystalline procaine penicillin G, 100,000 units of buffered crystalline sodium penicillin G, and 1 g. of dihydrostreptomycin in the form of its sulfate, all said compounds present in the form of a fine dry powder.

The contents of ampoule A are added to ampoule B and are vigorously shaken therewith. The mixture obtained is then injected intramuscularly and forms a depot of the antibiotics of considerably prolonged activity.

*Example 53*

Ampoule A: 2 cc. of a 5% gelatin solution.

Ampoule B: 500 mg. of crystalline terramycin hydrochloride in dry powdered form.

Ampoule C: 50 mg. of fibrinogen and 1 unit of thrombin, both in dry powdered form.

The contents of ampoules A and C are mixed with each other and, after fibrinogen and thrombin are dissolved, the solution obtained is added to ampoule B. The mixture is vigorously shaken and is then injected intramuscularly to produce a depot of the antibiotic of considerably prolonged activity.

*Example 54*

Ampoule A: 10 cc. of a 15% gelatin solution containing 0.2 g. of potassium thiocyanate and finely suspended therein 1 g. of iodoform.

Ampoule B: 50 mg. of dichro chloride, 30 g. of silver thiocyanate, and 50 mg. of barium sulfate.

Ampoule C: 1.5 cc. of a 5% solution of ammonium chloride.

The contents of ampoule C are added to ampoule B to dissolve the dichro chloride and to suspend the insoluble salts by repeated vigorous shaking. The mixture is allowed to stand for about 30 minutes. Said suspension is then added to ampoule A and is thoroughly mixed therewith. After two minutes the mixture is introduced into an abscess or a fistula wherein it solidifies to a gel which slowly and continuously releases the disinfecting agent.

*Example 55*

Ampoule A: 5 cc. of a 15% gelatin solution containing 0.5 g. of magnesium chloride, and 0.5 g. of the sodium salt of p-amino salicylic acid.

Ampoule B: 1 cc. of an aqueous solution containing 1 mg. of chromium in the form of chrome alum and 50 mg. of sodium chloride.

The contents of both ampoules are intimately mixed in a syringe and then introduce into abscesses caused by tuberculosis. The solidified gel slowly and gradually releases the p-amino salicylic acid.

*Example 56*

Ampoule A: 10 cc. of a 12% gelatin solution containing 2 g. of ethylstibamine, 40 mg. of barium sulfate and 5 mg. of dibucaine hydrochloride.

Ampoule B: 70 mg. of benzoquinone in dry powdered form.

The contents of ampoule A are added to ampoule B and are intimately mixed therewith until benzoquinone is completely dissolved. The mixture is then injected intramuscularly to form a depot of ethylstibamine having a prolonged effect.

Of course, many changes and variations may be made in the above given examples. Other therapeutically effective compounds may be used provided it is desired to produce a prolonged effect of the same. A preparation according to this invention may have the further advantage that the drug is released at about the same rate over almost the entire period of activity while with depots as they were employed heretofore, usually a very strong shock-like effect was initially observed while subsequently the activity of said depot diminished considerably and frequently did not suffice to produce satisfactory therapeutic effects. Other hardenable, coagulable, settable, solidifiable, or gelling compounds and other agents causing such hardening, coagulating, setting, solidifying, or gelling than those mentioned in the examples may also be used. Likewise, other agents to regulate viscosity, to retard or accelerate hardening, coagulating, setting, solidifying, or gelling, to stabilize the compositions according to the present invention and their components, to adjust their pH-value, to protect the therapeutically effective compounds, than those mentioned in the examples may be added. Many changes in the temperature, the reaction conditions, concentrations, and proportions of the components may be made by those skilled in the art in accordance with the principles set forth herein and in the claims annexed hereto.

The term "protein-like compound," the aqueous solution of which is solidified by the action of a chemical solidifying agent, as used in the specification and the claims annexed hereto, includes not only proteins such as gelatin, but also other hardenable, coagulable, settable, solidifiable, gelling compounds, such as fibrinogen, hyaluronic acid, nucleic acids, certain polysaccharides, vegetable gums, synthetic resinous compounds, and others more, provided their hardening, coagulating, setting, solidifying, or gelling time can be retarded or accelerated to such an extent that their aqueous solutions can safely be injected in the fluid state but form, shortly after injection, a hardened, coagulated, set, solidified, or gelled depot in the body which is slowly and gradually absorbed by the body and the body fluids and which, thus, slowly and gradually releases the therapeutically effective compound uniformly distributed therethrough and, thereby causing said therapeutically effective compound to exert a prolonged therapeutic effect.

The terms "solidified," "solidifying," "solidifiable," and the like as used in the specification and the claims annexed hereto, refer not only to the conversion of a substance or substance mixture into the solid state, but indicate also any other conversion from the fluid into the solid state, such as hardening, coagulating, setting, gelling, and others more. Solidified depots according to this invention are relatively insoluble in water but they are slowly and gradually dissolved, absorbed, decomposed, or in any other manner eliminated by the body fluids on account of their enzymatic or otherwise dissolving power.

The term "aqueous medium," as used in the specification and claims annexed hereto, includes not only water, but also other water-containing media, such as aqueous salt solutions, aqueous buffer solutions, emulsions of the water-in-oil and the oil-in-water type, or any other aqueous medium capable of dissolving the solidifiable compound and the solidifying agent and being injectable and substantially non-toxic to the body.

The term "therapeutically effective compound" as used in the specification and in the claims annexed hereto, indicates not only drugs used in therapy for curing and healing but also chemical compounds which are used as auxiliary means in combatting diseases, such as anesthetics, diagnostic aids, X-ray contrast agents, disinfectants, antiseptics, compounds used for nutritional purposes, prophylatics and others more. Likewise the term "therapeutic effect" indicates the effects of such so-called therapeutically effective agents.

The present invention can also be used with great advantage in the administration of orally effective agents which ordinarily produce a pronounced initial effect that may be harmful to certain sensitive patients. Injection of the depot preparations according to the present invention is accompanied by a gradual and uniform release of the therapeutic agent and thus avoids any harmful initial or shock-like effect.

We claim:

1. An injectable pharmaceutical composition forming, on injection, a drug depot at the site of injection, said composition comprising an injectable aqueous medium, fibrinogen dissolved therein, a water soluble compound forming fibrin with fibrinogen, and the drug to be administered uniformly distributed throughout the composition, said composition being liquid at body temperature for a time sufficient for injection and, upon injection into the human and animal tissue, depositing said drug depot at the site of injection.

2. An injectable pharmaceutical composition forming, on injection, a drug depot at the site of injection, said composition comprising an injectable aqueous medium, fibrinogen dissolved therein, thrombin, and the drug to be administered uniformly distributed throughout the composition, said composition being liquid at body temperature for a time sufficient for injection and, upon injection into the human and animal tissue, depositing said drug depot at the site of injection.

3. An injectable pharmaceutical composition forming, on injection, a drug depot at the site of injection, said composition comprising an injectable aqueous medium, gelatin dissolved therein in an amount of at least 10% of said composition, a water soluble chromium salt causing coagulation of said gelatin to a gel, and the drug to be administered uniformly distributed throughout the composition, said composition being liquid at body temperature for a time sufficient for injection and, upon injection into the human and animal tissue, depositing said drug depot at the site of injection.

4. An injectable pharmaceutical composition forming, on injection, a drug depot at the site of injection, said composition comprising an injectable aqueous medium, gelatin dissolved therein in an amount of at least 10% of said composition, a water soluble chromium salt causing coagulation of said gelatin to a gel, said gelatin and said chromium salt being present in said composition in the proportion between about 1 part of chromium ion to about 130 parts of gelatin and about 1 part of chromium ion to about 1350 parts of gelatin, and the drug to be administered uniformly distributed throughout the composition, said composition being liquid at body temperature for a time sufficient for injection and, upon injection into the human and animal tissue, depositing said drug depot at the site of injection.

5. An injectable pharmaceutical composition forming, on injection, a drug depot at the site of injection, said composition comprising an injectable aqueous medium, fibrinogen dissolved therein in an amount corresponding to at least about 1.7% of the composition, thrombin, said fibrinogen and said thrombin being present in said composition in the proportion between about 1 unit of thrombin to about 75 mg. of fibrinogen and about 1 unit of thrombin to about 100 mg. of fibrinogen, and the drug to be administered uniformly distributed throughout the composition, said composition being liquid at body temperature for a time sufficient for injection and, upon injection into the human and animal tissue, depositing said drug depot at the site of injection.

6. An injectable pharmaceutical composition forming, on injection, a drug depot at the site of injection, said composition comprising an injectable aqueous medium, gelatin dissolved therein in an amount of at least 10% of said composition, a mononuclear aromatic quinone, and the drug to be administered uniformly distributed throughout the composition, said composition being liquid at body temperature for a time sufficient for injection and, upon injection into the human and animal tissue, depositing said drug depot at the site of injection.

7. An injectable pharmaceutical composition forming, on injection, a drug depot at the site of injection, said composition comprising an injectable aqueous medium, gelatin dissolved therein in an amount of at least 10% of said composition, benzoquinone, and the drug to be administered uniformly distributed throughout the composition, said composition being liquid at body temperature for a time sufficient for injection and, upon injection into the human and animal tissue, depositing said drug depot at the site of injection.

8. An injectable pharmaceutical composition forming, on injection, a drug depot at the site of injection, said composition comprising an injectable aqueous medium, gelatin dissolved therein in an amount of at least 10% of said composition, a water soluble metal salt causing coagulation of said gelatin to a gel, and the drug to be administered uniformly distributed throughout the composition, said composition being liquid at body temperature for a time sufficient for injection and, upon injection into the human and animal tissue, depositing said drug depot at the site of injection.

9. In a method of producing an injectable pharmaceutical preparation, the steps comprising mixing, shortly before injection, an aqueous fibrinogen solution of at least 1.7% of fibrinogen with a water soluble compound forming fibrin with fibrinogen and incorporating into and uniformly distributing throughout said mixture the drug to be administered by injection, the amount of said fibrin-forming compound being insufficient to form fibrin during mixing and injection but sufficient to deposit the drug and the formed fibrin in the form of a drug depot at the site of injection.

10. In a method of producing an injectable pharmaceutical preparation, the steps comprising mixing, shortly before injection, an aqueous fibrinogen solution of at least 1.7% of fibrinogen with thrombin and incorporating into and uniformly distributing throughout said mixture the drug to be administered by injection, said fibrinogen and said thrombin being present in said mixture in the proportion between about 1 unit of thrombin to about 75 mg. of fibrinogen and about 1 unit of thrombin to about 100 mg. of fibrinogen.

11. In a method of producing an injectable pharmaceutical preparation, the steps comprising mixing, shortly before injection, an aqueous gelatin solution of at least 10% gelatin with a water soluble chromium salt causing coagulation of said gelatin to a gel and incorporating into and uniformly distributing throughout said mixture the drug to be administered by injection, the amount of said chromium salt being insufficient to cause coagulation of the preparation during mixing and injection but sufficient to deposit the drug and the coagulated gelatin in the form of a drug depot at the site of injection.

12. In a method of producing an injectable pharmaceutical preparation, the steps comprising mixing, shortly before injection, an aqueous gelatin solution of at least 10% gelatin with a water soluble chromium salt causing coagulation of said gelatin to a gel and incorporating into and uniformly distributing throughout said mixture the drug to be administered by injection, said gelatin and said chromium salt being present in said mixture in the proportion between about 1 part of chromium ion to about 130 parts of gelatin and about 1 part of chromium ion to about 1350 parts of gelatin.

13. In a method of producing an injectable pharmaceutical preparation, the steps comprising mixing, shortly before injection, an aqueous gelatin solution of at least 10% gelatin with a water soluble metal salt causing coagulation of said gelatin to a gel and incorporating into and uniformly distributing throughout said mixture the drug to be administered by injection, the amount of said metal salt being insufficient to cause coagulation of the preparation during mixing and injection but sufficient to deposit the drug and the coagulated gelatin in the form of a drug depot at the site of injection.

14. In a method of producing an injectable pharmaceutical preparation, the steps comprising mixing, shortly before injection, an aqueous gelatin solution of at least 10% gelatin with a water soluble mononuclear aromatic quinone and incorporating into and uniformly distributing throughout said mixture the drug to be administered by injection, the amount of said quinone being insufficient to cause coagulation of the preparation during mixing and injection but sufficient to deposit the drug and the coagulated gelatin in the form of a drug depot at the site of injection.

15. In a method of producing an injectable pharmaceutical preparation, the steps comprising mixing, shortly before injection, an aqueous gelatin solution of at least 10% gelatin with a water soluble benzoquinone and incorporating into and uniformly distributing throughout said mixture the drug to be administered by injection, the amount of said benzoquinone being insufficient to cause coagulation of the preparation during mixing and injection but sufficient to deposit the drug and the coagulated gelatin in the form of a drug depot at the site of injection.

References Cited in the file of this patent

UNITED STATES PATENTS 2,530,480　Pitkin　Nov. 21, 1950
2,533,004　Ferry et al.　Dec. 5, 1950

OTHER REFERENCES

Progress in Leather Science, 1920–1945, British Leather Manufacturers' Research Association, London, England, 1948, page 528.

O'Flaherty et al.: Chemistry and Technology of Leather, vol. 2, Reinhold Publishing Corp., New York, 1958, page 43.